United States Patent Office 2,982,323
Patented May 2, 1961

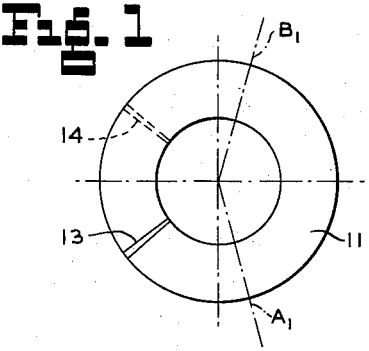
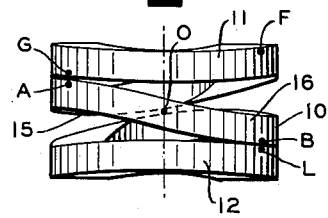
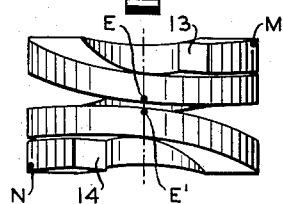
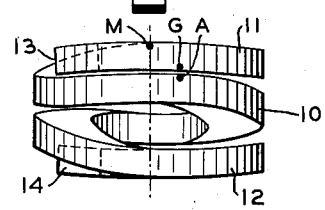
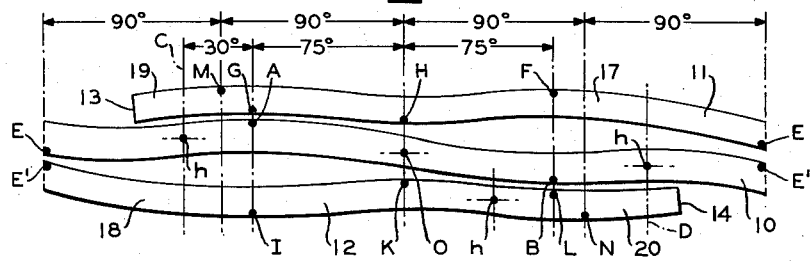
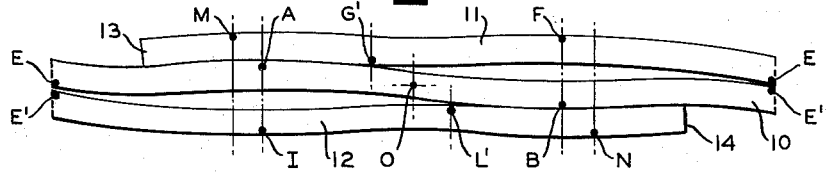
INVENTORS
FRIEDRICH KARL VOSSLOH
HERMANN MEIER
BY
ATTORNEY

2,982,323

COILED SPRING WASHER HAVING COILS BEARING OPPOSED VERTICES AND TROUGHS

Friedrich Karl Vossloh, 10 Steinwerth, Werdohl, Germany, and Hermann Meier, 41 Marienstrasse, Minden, Germany Filed Apr. 10, 1956, Ser. No. 577,259

Claims priority, application Germany June 2, 1950

4 Claims. (Cl. 151—38)

The invention relates to a coiled spring washer of the type described in my co-pending application for U.S. Patent, Serial Number 229,314, filed June 1, 1951, now abandoned, and of which this application is a continuation in part. Washers of the type here under consideration are useful for many purposes, and especially as locking washers for nuts in railroad superstructure construction. A conventional washer for that purpose is a spring consisting of a wire of rectangular cross-section coiled into two helical convolutions which are crimped wave-like out of the line of the basic helix. In such a conventional washer the maximum length of the basis of the crimp of each convolution equals the outer diameter of the washer corresponding to a distance of 180° of the end points of a crimp from each other. Under compression the convolutions will first come to bear upon each other with the free ends, the deflection being similar to that of a corresponding normal spring. A further increase of the load will then flatten the crimped or arched portions, a relatively much higher load being required for such flattening than for the deformation of the basic helix. Hence, while e.g. in a certain kind of conventional washers of the mentioned type a load of 1000 kilograms causes a deflection, i.e. a reduction of the axial length of the washer of about 4.7 millimeters, an increase of the load from 1000 to 3000 kilograms causes a deflection of merely .6 millimeter.

Now it has been found that such rate of deflection in the higher range of compression is undesirably small. If it is assumed that such a conventional washer is used in a screw connection, such as in a railroad superstructure where the bearing surfaces of the connected parts are subject to intense wear, and that originally the connection was so tightened as to compress the washer with 3000 kilograms, then a surface wear of only .6 millimeter will reduce the compression to 1000 kilograms and will correspondingly lower the locking effect of the washer.

The invention aims to avoid this drawback and to provide a coiled spring washer which in the higher range of loads will deflect appreciably more than a washer of the mentioned conventional type.

The invention further aims to provide a washer of a wire of rectangular cross-section and so helically coiled as to form a middle convolution and two adjoining end convolutions each of a length between three quarters of a coil and a complete coil wherein the convolutions are wave-like crimped or arched out of the line of the helix and form three potential contact points between the convolutions, one of said points being located diametrically opposite the mid-length point of the middle convolution and the other two points are located near the free ends, respectively, of the end convolutions.

Another object of the invention is the provision of a washer of the mentioned type, wherein the middle convolution is crimped to form a wave and the end convolutions are so crimped as to form a wave crest in registry with a wave trough of the middle convolution, and also a wave trough in registry with a wave crest of the middle convolution, and wherein the end points of each crimp are spaced appreciably more than 180°, preferably between 240 and 270°.

A washer according to the invention has a portion of the middle convolution so wave-like crimped that there is a crest vertex and a trough vertex at opposite sides of and equally spaced from the mid-length point of the middle convolution, and the remaining portions of the middle convolution and the adjoining end convolutions being so wave-like bent that there are points of potential initial contact, one diametrically opposite the mid-length point and one between each vertex and the end portion of the adjacent end convolution.

Further objects and details of the invention will be apparent from the description given hereinafter and the accompanying drawing illustrating an embodiment thereof by way of example.

In the drawing:

Fig. 1 is a top plan view of a washer according to the invention,

Fig. 2 is a front elevation of the washer of Fig. 1,

Fig. 3 is a rear view,

Fig. 4 is a side elevation, and

Figs. 5 and 6 are developed views of the washer at zero load and high load, respectively.

Referring now to the drawing, the washer is coiled of wire and comprises a middle convolution 10 and an upper and a lower end convolution 11 and 12, respectively. Although Figs. 1 to 4 clearly show the washer according to the invention, Figs. 5 and 6 are added to facilitate the understanding of the shape and the operation thereof. In these figures, which are developments of the washer, the total length of each figure corresponds to one complete convolution of 360° and the figure is obtained by visualizing a section in an axial plane through the middle convolution at equal distances of the ultimate ends of the upper and lower convolutions that means in an axial plane from $a$ to $b$ in Fig. 1, i.e. through points E, E' in Fig. 3, then, spreading the three convolutions so that the middle convolution extends from E to E' in the position of Fig. 5, and finally arranging the spread upper and lower convolutions in their correct relative positions in respect to the middle convolution. An imaginary view of a complete development of the peripheral surface of the whole washer can be obtained by visualizing the upper convolution with its right hand end in Fig. 5 attached to the left hand end of the middle convolution and the left hand end of the lower convolution attached to the right hand end of the middle convolution. Hence, both ends of Figs. 5 and 6 are located on the same sectional plane of the spring washer. In Fig. 5, the washer is not loaded, whereas in Fig. 6 it is assumed that the washer is under a load of 3000 kilograms corresponding to that of the conventional washer mentioned hereinbefore. In the illustrated embodiment, the middle convolution has a total length of 360° and the end convolutions each a length of about 315°. The convolutions are crimped or bowed out of the line of the helix $h$ according to which the wire, of rectangular cross-section, is coiled. This cross-section is visible at the ends 13 and 14 in Fig. 3, whereas some points of the helix are indicated in Fig. 5 by intersection dot and dash lines. As clearly shown in Figs. 2 and 5, the middle convolution is so bent as to form a wave with a crest 15 having a vertex A and a trough 16 having a vertex B. The vertices A and B are equally spaced from the mid-length point O. In Fig. 1 the radii on which the points A and B are located have the reference characters $A_1$ and $B_1$, respectively; they are spaced 150° from each other. The wave extends between the axial plane indicated by the lines C and D. It will be noted that the wave portions $\overline{OA}$ and $\overline{OB}$ need not be equal to the portions $\overline{AC}$ and $\overline{BD}$. In fact, it is preferred that the first mentioned portions are longer than the last mentioned ones. Diametrically opposite the mid-length point O, the end points of the middle convolution are denoted by E and E' in Figs. 3, 5 and 6. The portion $\overline{CE}$ with the adjoining upper end convolution, and the portion $\overline{DE'}$ with the adjoining lower end convolution are also wave-like bowed out of the line of the helix $h$ in such a manner that points E and E' are rather close to each other, and that the upper end convolution forms a crest 17 with vertex F in registry with the vertex B of the middle convolution and has a point G in registry with and in very close proximity to the point A. It will be noticed that the spacing between the upper end and the middle convolutions increases very gradually from point G to point H, which is in registry with the mid-length point O, whereas the spacing increases at an appreciably higher rate in the portion between points H and F. Similarly, the lower end convolution has a trough 18 with vertex I in registry with the vertex A, a point K in registry with the mid-length point O, and a point L in registry with and in close proximity to point B. The ultimate end portions 19 and 20, which extend in the upper end convolution between 13 and G and in the lower end convolution between 14 and L, respectively, are approximately as close to the middle convolution as the points G and L. Now it will be seen that the arched portion $\overline{GE}$ of the upper end convolution and the portion $\overline{E'A}$ of the middle convolution registering with $\overline{GE}$ extend each 180° plus the distance $\overline{OA}$. Similarly, the lower portions $\overline{E'L}$ and $\overline{EB}$ extend 180° plus $\overline{OB}$. In other words, the effective arched portions of the upper and lower convolutions have each a length of 180° plus the spacing of one of the vertices A and B from the midlength point O. Purely from the theoretical view point, the point A, for instance, may be located anywhere between the point O and the point E. Of course, the portions 19 and 20 must always be so far extended that there may be a point G in registry with A and a point L in registry with B. It follows, that in a three-coil washer of a design according to our invention, the basis of the arched portions must extend not less than 180° and not more than 360°. In practice, however, in order to avoid too steep an inclination of a portion of the washer, the vertex A, and thus, also the vertex B, should be spaced from the mid-length point between about 60 to 90°, which results in a base length of the arched portions of between 240 and 270°. We have found that a 75° spacing of the mentioned vertices from the point O gives very satisfactory results. The length of the portions 19 and 20 can be selected rather freely. They serve, on the one hand, as an elongated support to transmit the load to the middle convolution, as hereinafter explained. On the other hand, they are destined, together with the points F and I, to receive the load from the outside. For this purpose they include points M and N coplanar with the points F and I, respectively. In Fig. 5 they are shown, in their preferred location, as spaced about 180° from each other. But they may be located anywhere on the outside of the portions 19 and 20.

Owing to the described structure of the washer, the points A, G; B, L; and E, E' are potential contact points at zero load. When the spring washer is in use, points A, G and B, L and the end portions 19 and 20 make contact with the adjacent portions of the middle convolution practically immediately when a compressive force is applied at M and F with reaction at N and I. Shortly thereafter, when the compression increases but is still in the range of a relatively small load, the points E and E' will contact each other as the washer deflects in the manner of a normal helical spring. When the compression further increases, the bowed portions of the middle convolution between the axial planes C and D and the crest 17 and trough 18 of the end convolutions, will be gradually flattened. Simultaneously, the points G and L, where the inner ends of the ultimate end portions 19 and 20 bear on the middle convolution, will travel towards each other and finally, when the washer is under full load as in Fig. 6, reach the points G' and L', respectively. The pressure points E, E', however, will not change their position. Hence, in the illustrated embodiment, the original supporting bases for the arched portions of the washer extend from point E to point G for the upper, and from point E' to L for the lower convolution, i.e. 255° for each, and decreases under full load so as to extend from E to G' and from E' to L', i.e. approximately 200°. The fact that each supporting base extends from a point opposite the mid-length point to a wave line vertex circumferentially beyond the mid-length point ensures, in all instances, a base length of more than 180°, which is necessary in order to obtain a particularly large, highly durable spring movement in the high tension range.

Thus it has been found that with a washer according to the invention a deflection of about three times that of a conventional comparable washer can be obtained for loads between 1000 and 3000 kilograms. It has further been found that in order to obtain best results, the vertices of the wave of the middle convolution should be spaced between 120 and 180.

The desirable large spring movement is accomplished entirely by the provision of the illustrated three turn washer having a total of about two and three-quarters convolutions, the arcuations of which are formed and relatively arranged as shown and described hereinbefore. In practice it has been found that in the maintenance of railroad trackage, the adherence of the rail to the sleeper of the track when the three turn washer according to the invention is used, decreased at a rate much more retarded than is true when washers previously devised are used, so that a tight connection between the rail and sleeper will be maintained for a proportionally greater length of time, reducing to a marked degree the cost of material and labor expended in track maintenance.

It will be apparent to those skilled in the art that many alterations and modifications of the structure illustrated and hereinbefore described can be made without departure from the essence and spirit of the invention which for that reason shall not be limited but by the scope of the appended claims.

We claim:
1. A spring washer consisting of a wire rectangular in cross-section and helically coiled so as to form one complete middle convolution and an upper and a lower end convolution, each of a length between three quarters of a coil and a complete coil, the middle convolution being axially bent out of the line of said helix so as to form with its major portion one first wave with the vertex of its crest on the side of said upper end convolution and closely adjacent thereto and the vertex of its trough on the side of said lower end convolution and also closely adjacent thereto, said vertices being equally spaced from the mid-length point of said middle convolution and spaced from each other between 120 and 180 degrees, the remaining portions of said middle convolution together with the adjacent lower and upper end convolutions, respectively, being also wave-like bent out of the line of said helix so that the end points of said middle convolution diametrically opposite said mid-length point are in close proximity to each other, said upper end convolution having a vertex of a wave crest substantially in the same axial plane as the vertex of the trough of said first wave, said lower end convolution having a vertex of a trough substantially in the same axial plane as the vertex of the crest of said first wave, and the end portions of said end convolutions between their ultimate ends and the axial planes of the adjacent vertices, respectively, of said first wave being in close proximity to the adjacent portions of said middle con- volution, whereby said washer has three initial contact points, a first one opposite said mid-length point, and a second and a third one at said vertices, respectively, of said first wave.

2. A spring washer as defined in claim 1 in which the spacing of the middle convolution from each adjacent end convolution between the vertices of the first wave increases from the axial plane through the vertex nearest the adjacent end convolution towards the axial plane through the other vertex, first very gradually and then at an increasing rate, whereby said second and third contact points move towards said first one as the compression of the washer increases once contact has been effected.

3. A lock washer comprising a piece of coil spring having a pair of outer turns and one intermediate turn, each outer turn being provided with two substantially diametrically opposite humps tangent to a plane transverse to the coil axis and forming concavities facing said intermediate turn, a first one of each pair of humps being adjacent to the free end of the outer turn provided with it; said intermediate turn having diametrically opposite portions deformed into substantial parallelism with said concavities formed by said first humps, the concave sides of said first humps respectively contacting said deformed portions, upon an initial axial compression of said coil spring without substantial deformation of said humps, over an arc in excess of 90°.

4. A lock washer according to claim 3 wherein each of said humps and deformed portions constitutes the peak of an arched coil segment extending over an angle close to 180°.

References Cited in the file of this patent
UNITED STATES PATENTS
1,362,675    Conway _____ Dec. 21, 1920